United States Patent [19]

Nishizawa

[11] Patent Number: 5,507,001
[45] Date of Patent: Apr. 9, 1996

[54] MICROCOMPUTER INCLUDING CPU AND SERIAL DATA COMMUNICATION UNIT OPERATING IN SYNCHRONISM

[75] Inventor: Kazuyuki Nishizawa, Tokyo, Japan

[73] Assignee: NEC Corporation, Tokyo, Japan

[21] Appl. No.: 347,157

[22] Filed: Nov. 23, 1994

Related U.S. Application Data

[63] Continuation of Ser. No. 745,436, Aug. 15, 1991, abandoned.

[30] Foreign Application Priority Data

Aug. 15, 1990 [JP] Japan ................................. 2-215566

[51] Int. Cl.⁶ .................................................... G06F 13/38
[52] U.S. Cl. ......................... 395/825; 395/842; 395/878; 364/DIG. 1
[58] Field of Search ...................... 395/275, 200, 395/325, 425, 200.05, 200.07, 821, 825, 842, 845, 878

[56] References Cited

U.S. PATENT DOCUMENTS

| | | | |
|---|---|---|---|
| 4,052,702 | 10/1977 | Smith et al. | 395/880 |
| 4,122,520 | 10/1978 | Adamchick et al. | 395/845 |
| 4,475,155 | 10/1984 | Oishi et al. | 395/842 |
| 4,975,832 | 12/1990 | Saito et al. | 395/843 |
| 5,025,414 | 6/1991 | Iwamoto | 395/650 |
| 5,051,890 | 9/1991 | Nagasaki et al. | 395/421.03 |
| 5,140,679 | 8/1992 | Michael | 395/286 |
| 5,251,303 | 10/1993 | Fogg, Jr. et al. | 395/844 |

FOREIGN PATENT DOCUMENTS 0218955 9/1986 European Pat. Off. .

OTHER PUBLICATIONS

"Single Chip Eight Bit Microcontrollers", 1986, Philips Eindhoven NL, pp. 78–96.

Component Data Catalog, Jan. 1982, Intel Corp., Santa Clara CA, pp. 6–24 6–38.

Databus, No. 7, Sep. 1981, Deventer NL, pp. 43–47.

*Primary Examiner*—Parshotam S. Lall
*Assistant Examiner*—Viet Vu
*Attorney, Agent, or Firm*—Whitham, Curtis, Whitham & McGinn

[57] ABSTRACT

A microcomputer performs serial data transfer for a peripheral device in synchronism with machine cycles of the CPU without requesting an interrupt routine of the CPU. The microcomputer incorporates an improved serial data communication unit having a serial data terminal and a serial clock terminal coupled to the peripheral device. The CPU supplies a transfer start command to the serial data communication unit when it executes a serial data communication instruction. A serial clock control circuit in the serial data communication unit responds to the transfer start command to supply the clock terminal with a serial clock signal having the same frequency as the clock signal of the CPU in synchronism with the beginning of a certain machine cycle. A data transfer control circuit responds to the transfer start command and operates, in a first mode, to cause a shift register to output data stored therein to the serial data terminal in synchronism with the serial clock signal and, in a second mode, to cause the shift register to capture data appearing at the serial data terminal in synchronism with the serial clock signal.

3 Claims, 5 Drawing Sheets

5,507,001

MICROCOMPUTER INCLUDING CPU AND SERIAL DATA COMMUNICATION UNIT OPERATING IN SYNCHRONISM

This is Continuation of application Ser. No. 07/745,436 filed Aug. 15, 1991, now abandoned.

BACKGROUND OF THE INVENTION

The present invention relates to a microcomputer and, more particularly, to a single chip microcomputer including a serial data communication unit.

As well known in the art, serial data transfer is widely employed as one of data communication methods between a microcomputer and a peripheral device such as a memory. The microcomputer thus includes a serial data communication unit as an I/O (Input/Output) unit.

While the CPU (Central Processing Unit) in the microcomputer manages or controls the serial data communication unit, the actual data transfer is carried out between the serial data communication unit and the peripheral device. Therefore, the CPU treats the serial data communication unit as an asynchronous I/O unit. In other words, CPU responds to a request from the serial data communication unit and then sets therein data to be transferred to the peripheral device or reads out therefrom data transferred from the peripheral device. Since the CPU continues to execute instructions for a program, in order to respond to the request it must suspend the program execution and then perform the above operation as an interrupt routine. The program execution efficiency and/or speed is thereby deteriorated.

SUMMARY OF THE INVENTION

Therefore, an object of the present invention is to provide a microcomputer including an improved serial data communication unit.

Another object of the present invention is provide a microcomputer including a serial data communication unit which performs serial data transfer for a peripheral device in synchronism with machine cycles of the CPU.

Still another object of the present invention is to provide a microcomputer including a serial data communication unit which performs serial data transfer between the microcomputer and a peripheral device without requesting an interrupt routine of the microcomputer.

A microcomputer according to the present invention comprises a CPU executing a string of instructions for a program in synchronism with a clock signal and a serial data communication unit including a serial data terminal and a serial clock terminal which are to be coup led to a peripheral device, the CPU supplying a transfer start command to the serial data communication unit when it executes a serial data communication instruction the serial data communication unit including a serial clock control circuit responding to the transfer start command and starting to supply the serial clock terminal with a serial clock signal having the same frequency as the clock signal in synchronism with the beginning of a certain machine cycle of the CPU, a shift register and a data transfer control circuit responding to the transfer start command and operating in a first mode to cause the shift register to output data stored therein to the serial data terminal one bit by one bit in synchronism with the serial clock signal and in a second mode to cause the shift register to capture data appearing at the serial data terminal one bit by one bit in synchronism with the serial clock signal.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
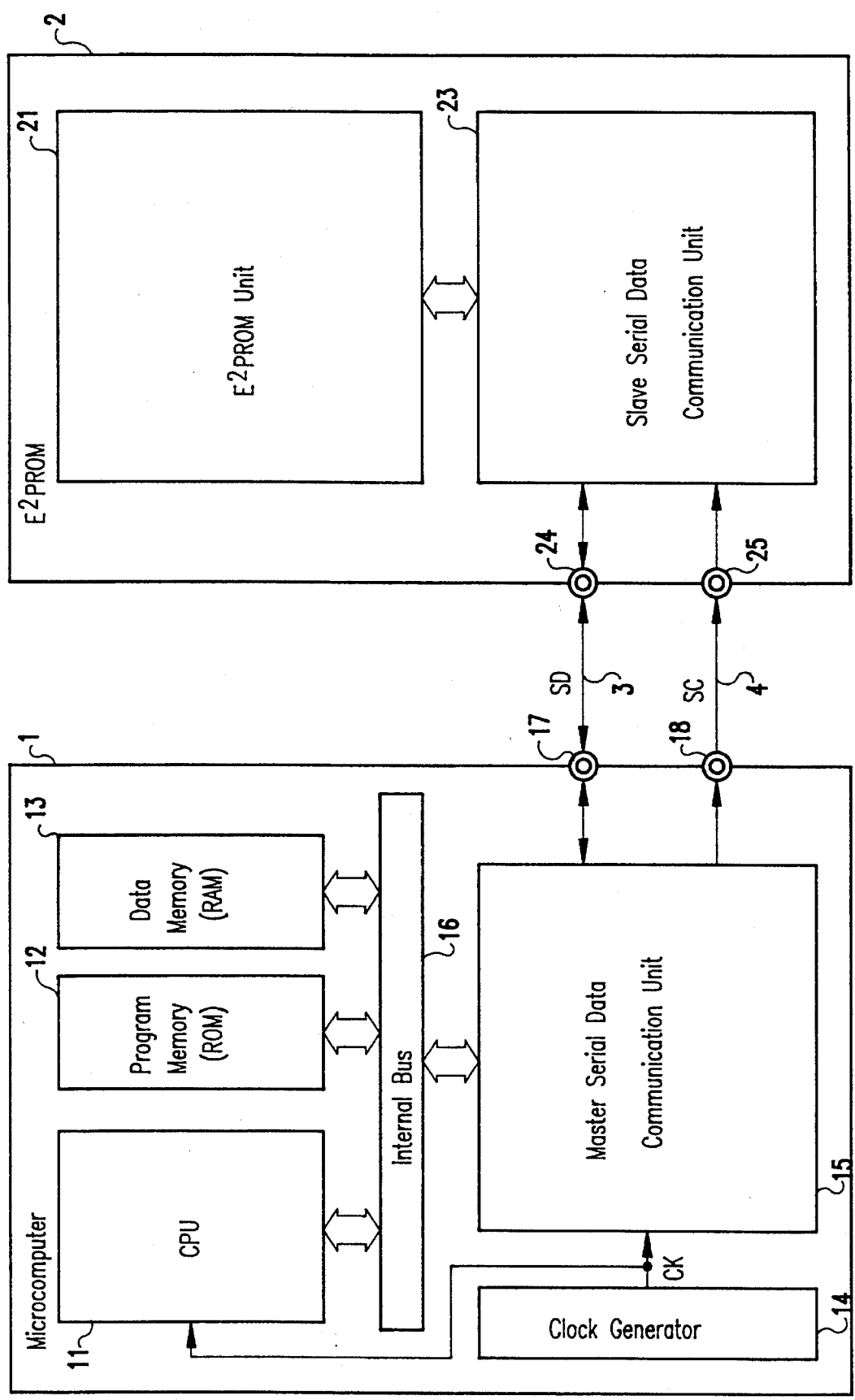
FIG. 1 is a block diagram representative of a microcomputer system employing a microcomputer according to an embodiment of the present invention.

Referring to FIG. 1, a microcomputer 1 according to an embodiment of the present invention is formed as a single semiconductor chip and includes CPU 11, a program memory 12, a data memory 13 and a master serial data communication unit 15 which are interconnected with one another through an internal bus 16 including address, data and control buses. Further included in the microcomputer 1 is a clock generator 14 generating and supplying a clock signal CK to CPU 11 and the unit 15. CPU 11 executes a string of instructions for a program stored in the program memory 12 to perform required operations on data stored in the data memory 13. CPU 11 further supplies the unit 15 with data to be transferred to $E^2PROM$ 2 as a peripheral device from the data memory 13 or an internal register therein (not shown) or reads out data from $E^2PROM$ 2 from the unit 15 to the data memory 13 or the internal register.

Figure 2:
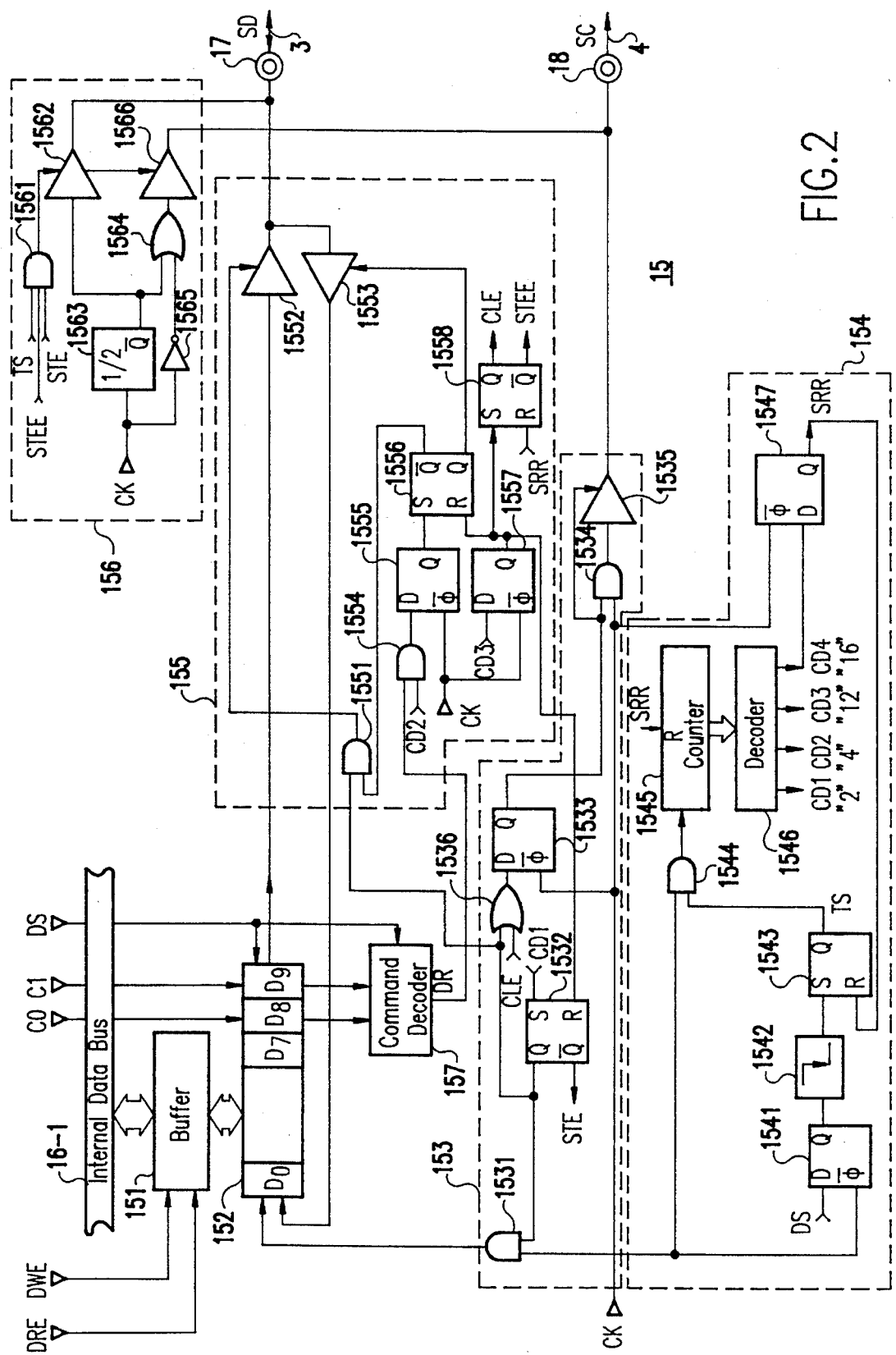
FIG. 2 is an internal circuit diagram representative of a serial data communication unit in the microcomputer shown in FIG. 1.

As shown in FIG. 2, the master serial data communication unit 15 includes a. transfer sequence control circuit 154, a data input/output control circuit 155 and a start bit generator 156. The transfer sequence control circuit 154 includes a serial clock FF 1543, a falling edge detector 1542, an AND gate 1544, a counter 1545 and a decoder 1546. This decoder 1546 decodes the count value of the counter 1545 and produces signals CD1, CD2, CD3 and CD4 when the count value is "2", "4", "12" and "16", respectively. The data input/output control circuit 155 includes AND gates 1551 and 1554, D-FFs 1555 and 1557, S-R FF 1556, a tristate output buffer 1552 and a tristate input buffer 1553. The start bit generator 156 includes an AND gate 1561, tristate output buffers 1562 and 1566, an OR gate 1564, an a ½ frequency divider 1563 and an inverter 1565. The above circuit elements are connected mutually as shown in the drawing.

Figure 3:
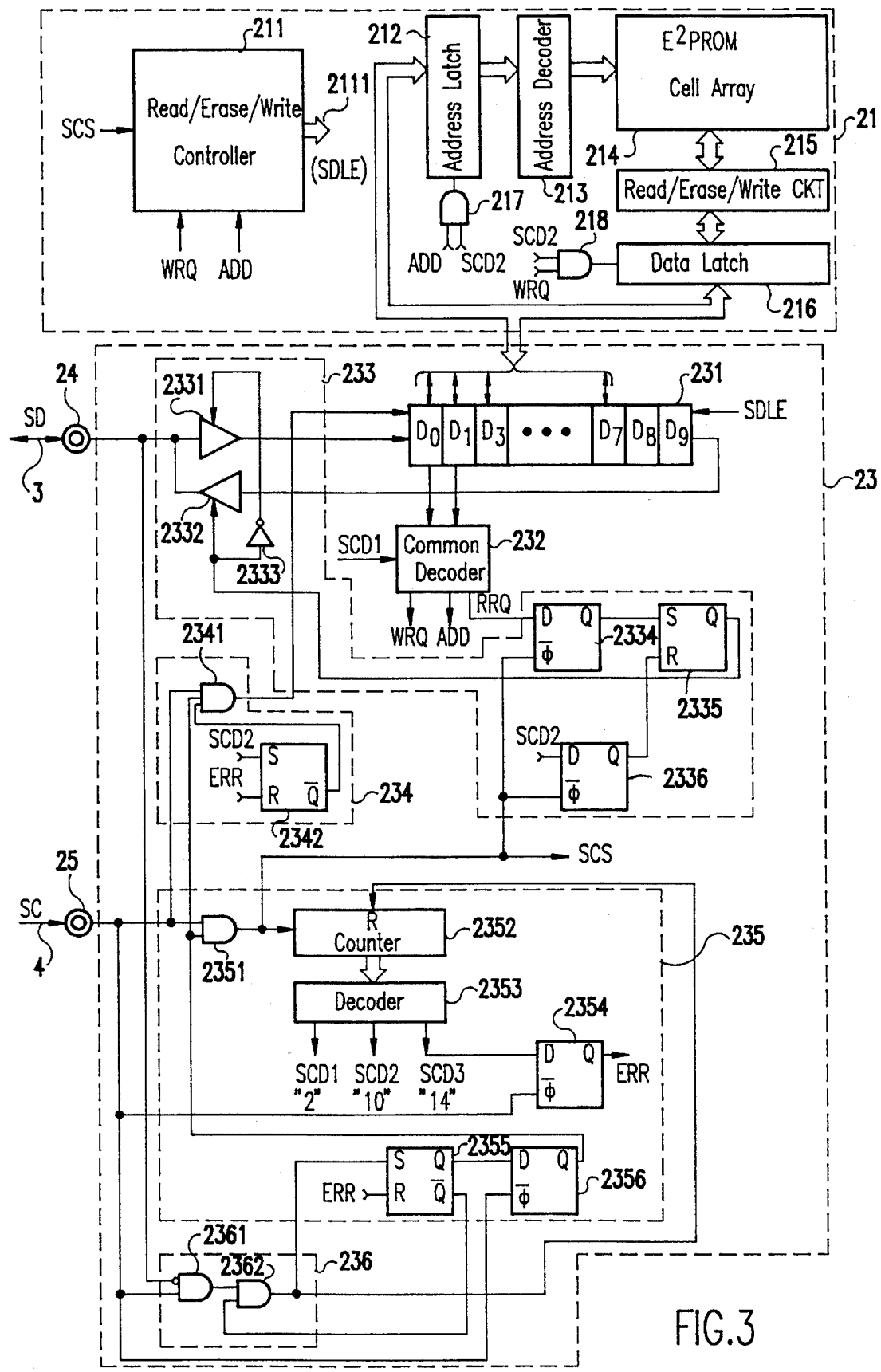
FIG. 3 is a circuit diagram representative of $E^2PROM$ (electrically erasable programmable read only memory) shown in FIG. 1.

Referring to FIG. 3, $E^2PROM$ 2 includes an $E^2PROM$ unit 21 and a slave serial data communication unit 23. $E^2PROM$ unit 21 of $E^2PROM$ 2 as a peripheral device includes a read/erase/write controller 211, an address latch circuit 212, an address decoder 213, an $E^2PROM$ cell array 214, a read/erase/write circuit 215, a data latch circuit 216 and two AND circuits 217 and 218. The slave serial data communication unit 23 includes a serial data terminal 24 and a serial clock terminal 25 coupled to the SD line 3 and SC line 4, respectively.

Returning to FIG. 2, the master serial data communication unit 15 includes a data buffer 151, a shift register 152 of a master-slave type, a command decoder 157 and, a clock control circuit 153 in addition to the transfer sequence control circuit 154, data input/output control circuit 155 and start bit generator 156. The shift register 152 is of 10-bit construction. The data buffer 151 is inserted between a data bus 16-1 in the internal bus 16 and the shift register 152. Since the data bus 151 is of 8-bit width, the buffer 151 couples the bus 151 to bit (LSB) $D_0$ to 7th bit $D_7$ of the register 152. The clock control circuit 153 includes AND gates 1531 and 1534, an S-R type flip-flop (called hereinafter "S-R FF") 1532, a D-type flip-flop (called hereinafter "D-FF") 1533 and a tristate output buffer 1535 which are connected as shown.

In FIG. 3, E²PROM 2 includes a shift register 231 of a master-slave type, a command decoder 232, a data input/output control circuit 233, a clock control circuit 234, a transfer sequence controller 235 and a start bit detector 236. The shift register 231 is of 10-bit construction, the 0th bit (LSB) $D_0$ to 7th bit $D_7$ of which are coupled in common to the latch circuits 212 and 216. The data input/output control circuit 233 includes a tristate input buffer 2331, a tristate output buffer 2332, an inverter 2333, two D-FFs 2334 and 2336 and an S-R FF 2335. The clock control circuit 234 includes an AND gate 2341 and an S-R FF 2342. The transfer sequence control circuit 235 includes an AND gate 2351, a counter 2352, a decoder 2353, an S-R FF 2355 and two D-FF 2354 and 2356. The decoder 2353 decodes the count value of the counter 2352 and produces signals SCD1, SCD2 and SCD3 when the count value is "2", "10" and "14", respectively. The start bit detector 236 includes two AND gates 2361 and 2362. The above circuit elements are connected naturally as shown in the drawing.

In FIGS. 2 and 3, each of the shift registers 152 and 231 is of a master-slave type and shifts and outputs data therein one bit by one bit in synchronism with the falling edge of a shift clock signal supplied thereto and captures and shifts data supplied thereto one bit by one bit in synchronism with the raising edge of the shift clock signal. Each of the counters 1545 and 2352 is of a raising count type and thus advances a count value thereof in synchronism with the raising edge of a clock signal supplied thereto.

Figure 4:
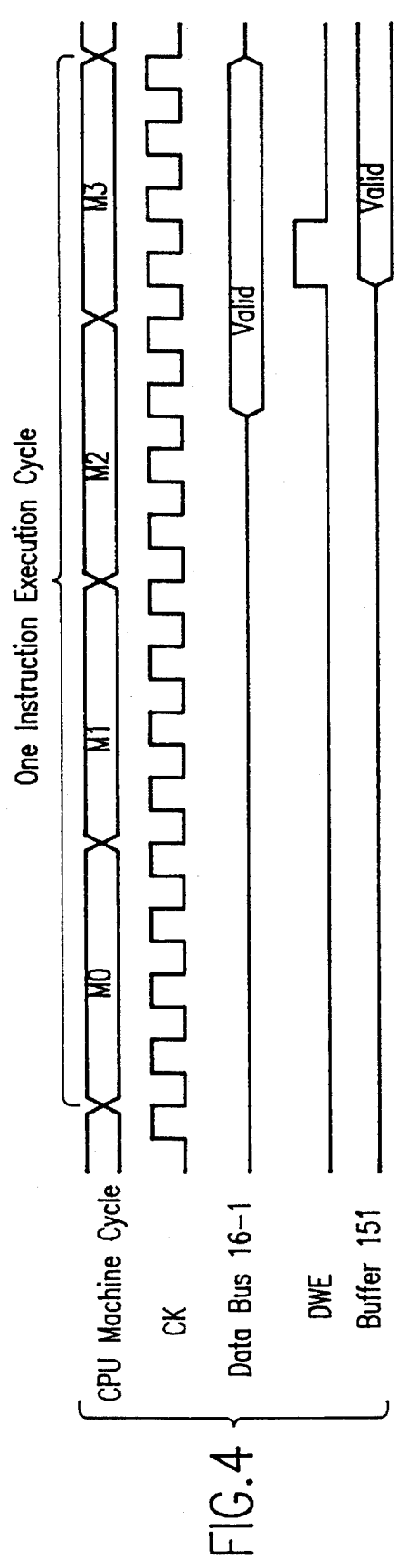
FIG. 4 is a timing chart representative of an operation of the microcomputer shown in FIG. 1.
Figure 5:
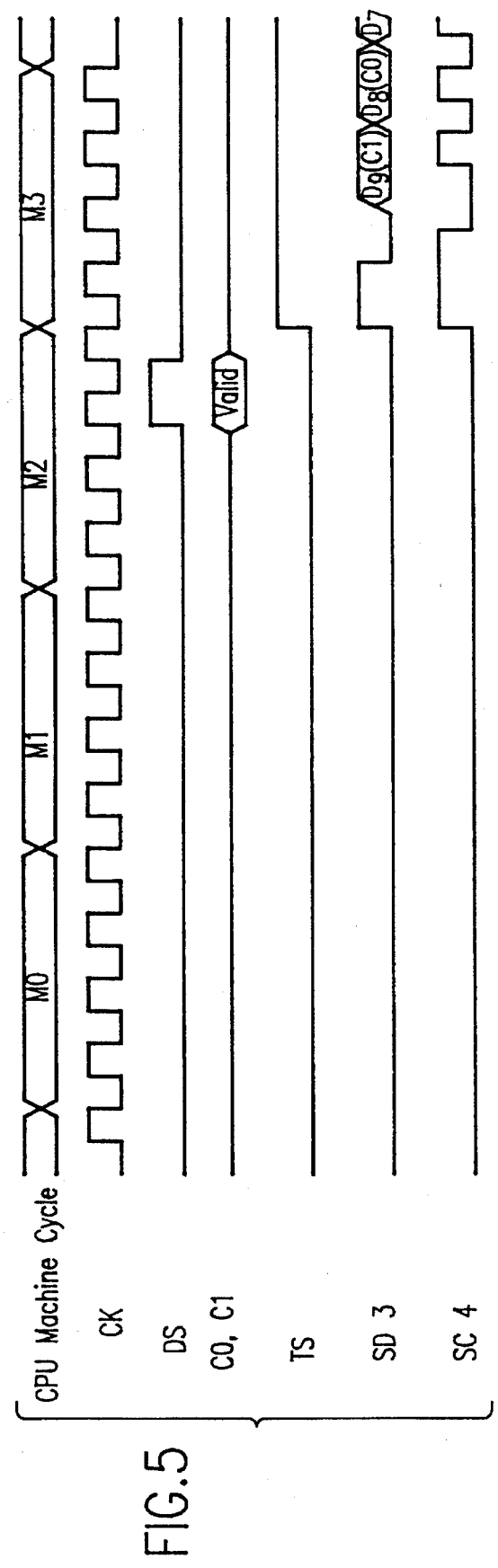
FIG. 5 is a timing chart representative of another operation of the microcomputer shown in FIG. 1.
Figure 6:
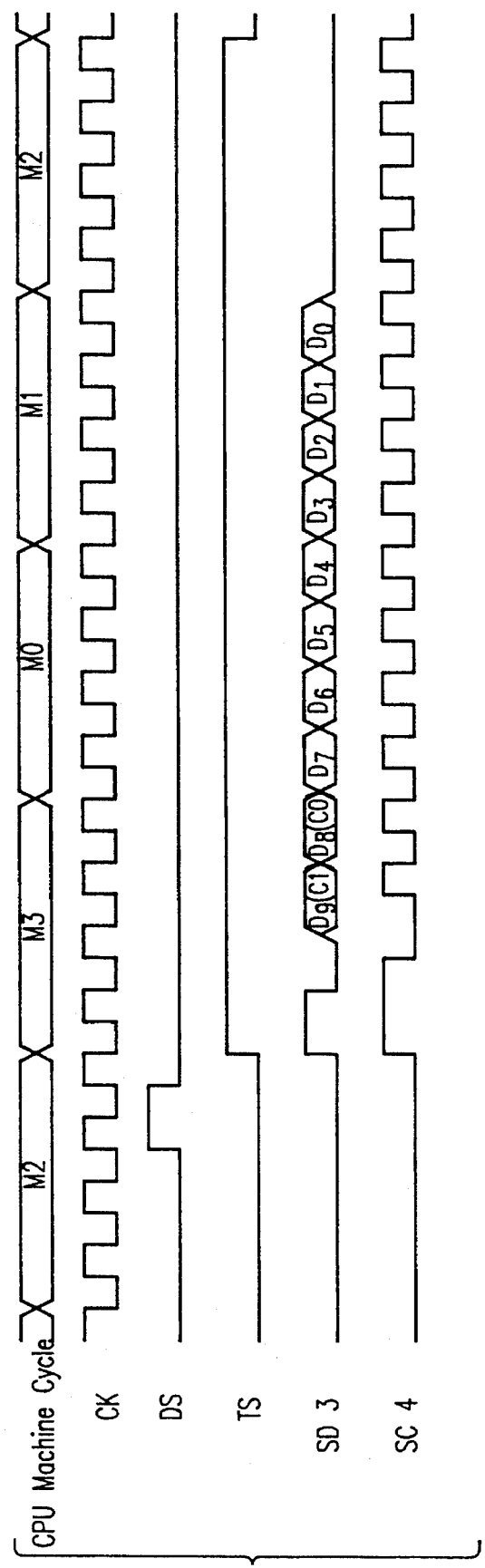
FIG. 6 is a timing chart representative of still another operation of the microcomputer shown in FIG. 1.

Next, an operation will be described with reference to FIGS. 1 to 3 and further to FIGS. 4 to 6 illustrating timing charts.

As shown in FIG. 4, CPU 11 executes each instruction in four machine cycles M0 to M3 including an instruction fetch operation, a decoding operation, an execution operation and an operand write operation. Each of the machine cycles M0 to M3 corresponds to a time period of four clock pulses of the clock signal CK.

Since E²PROM 2 is employed as a peripheral device in the present embodiment, the master serial data communication unit 15 performs operations. The first operation is to supply an address to E²PROM 2. The second operation is to supply data to be written into an accessed address of E²PROM 2. The third operation is to receive data from an accessed address of E²PROM 2. Each of these three operations will be described below.

In the first operation, CPU 11 executes at first a data load instruction to load data as an access address from the data memory 13 or the internal register therein to the data buffer 151. More specifically, as shown in FIG. 4, as a result of fetching and decoding this instruction in the first and second machine cycles M0 and M1, CPU 11 reads the address data from the memory 13 or the internal register and outputs it onto the data bus 16-1 in the third machine cycle M2. CPU 11 then generates a data write enable (DWE) signal in the fourth machine cycle M3. The address data on the data bus 16-1 is thus loaded into the buffer 151.

Thereafter, CPU 11 executes an address transfer instruction to transfer the address to E²PROM 2. As shown in FIG. 5, in the third machine cycle M2 of this instruction execution cycle, CPU 11 produces a DS signal while supplying an address transfer command consisting of C0 and C1. In response to the DS signal, the address data stored in the buffer 151 is loaded to the shift register 152 at the bit positions D0 to D7 and the command data C0 and C1 are loaded into the bit positions D8 and D9 of the register 152. The command data C0 and C1 are also loaded into the command decoder 157. Since the command data at this time represents an address transfer, a decoded signal DR is at a low level.

The DS signal is further supplied to D-FF 1541. By the operation of FFs 1541 and 1543 and the circuit 1542, a TS signal is changed to an active high level at the 10 beginning of the fourth machine cycle M3. The AND gate 1544 is thereby enabled to supply the clock signal CK to the counter 1545.

On the other hand, in the start bit generator 156, since the TS signal changes to the high level and an STE signal from SR FF 1532 is at the high level, the tristate buffers 1562 and 1566 are activated to drive the terminals 17 and 18. By the operation of the frequency divider 1563, inverter 1565 and OR gate 1564, the serial data terminal 17, i.e., SD line 3, in driven to the high level during one clock period, and the serial clock terminal 18, i.e., SC line 4, is driven to the high level during one and half clock periods, as shown in FIG. 5. The combination of those logic levels indicates a start bit.

When the rising edge of the clock signal CK arrives at the counter 1545, i.e., when the count value of the counter 1545 advances to "2", the decoder 1546 produces the CD1 signal to set S-R FF 1532. The STE signal is thereby changed to the low level to bring the tristate buffers 1562 and 1566 into a high impedance state. The set state of FF 1532 enabled the AND gate 1531 to supply the clock signal CK to the shift register as a shift clock signal. The set state of FF 1532 further activates the tristate buffer 1552 through the AND gate 1551 since the $\overline{Q}$ output of FF 1556 is at the high level at this time. Thus, the address data stored in the shift register 152 starts to be transferred one bit by one bit in synchronism with each falling edge of the clock signal.

The set state of the FF 1532 further opens the AND gate 1534 and activates the tristate buffer 1535 after delay of a half clock period by FF 1533. The serial clock having the same rate as the clock signal is thus transferred to the terminal 18.

On the other hand, in E²PROM 2, the start bit detector 236 detects the start bit to set FF 2355 and reset the counter 2352. The AND gate 2362 is thereby disabled. The set state of FF 2355 is captured in FF 2356 in synchronism with the falling edge of the level on the SC line 4, so that the AND gates 2341 and 2351 are enabled. At this time, the tristate buffer 1535 (FIG. 2) is in a high impedance state, and hence the level of the SC line 4 is at the low level. Since the tristate input buffer 2331 is in an activated state, the address data shifted out from the shift register 152 is transferred via the SD line to the shift register 231. The serial clock transferred via the SC line 4 is supplied to the shift register 231 and further to the counter 2352. Therefore, the shift register 231 fetches the data appearing at the terminal 24 in synchronism with the rising edge of the shift clock.

When the count value of the counter 2352 reaches "2", the decoder 2353 produces the SCD1 signal. In response thereto, the contents of the first and second bits D0 and D1 of the shift register 231, i.e., the command codes C0 and C1 representative of the address transfer, are fetched in the command decoder 232 which in turn produces an active ADD signals and inactive WRQ and RRQ signals. Since the RRQ signal is at the inactive low level, the state of the input/output control circuit 233 is not changed.

On the other hand, after the completion of the address transfer instruction, CPU 11 starts to execute another instruction. During this instruction execution, the data transfer between the units 15 and 23 continues to be performed, as shown in FIG. 6. Thus, all the data stored in the shift register 152 in the unit 15 are transferred serially to the shift register 231 in the unit 23. Note that the data transfer is completed in synchronism with the end of the second machine cycle M1, i.e., with the beginning of the third machine cycle M2. That is, the start and completion of the serial data transfer synchronize with the machine cycles. Therefore, the serial communication unit 15 is not required to issue an interrupt request to CPU 11 to inform the completion of the data transfer.

Turning back to FIG. 2, when the shift register 152 shifts out the final data D0, i.e., when the counter 1545 reaches the count value of "12", the decoder 1546 produces the CD3 signal. D-FF 1557 thereby produces the high level Q output in synchronism with the beginning of the machine cycle M2 to reset S-R FF 1532. The AND gate 1531 is thereby closed to prevent supply of the shift clock to the shift register 152. Since S-R FF 1558 is also set, the start bit generator 156 is held at the deactivated state. On the other hand, the Q output CLE of S-R FF 1558 is supplied via OR gate 1536 to FF 1533, and therefore, the serial clock continues to appear at the terminal 18 (SC line 4).

Referring again to FIG. 3, when the counter 2352 reaches the count value "10", the decoder 2353 produces the SCD2 signal. In response thereto, S-R FF 2342 is set disabling AND gate 2341. The shift clock is thereby prevented from being supplied to the shift register 231. Since the command decoder 232 supplies the active ADD signal to AND gate 217, the contents of bits D0 to D7 of the register 231 (i.e., address data) are latched into the latch circuit 212 in response to the SCD2 signal. The active ADD signal is further supplied to the read/erase/ write controller 211. The serial clock derived from AND gate 2351 is further supplied to the controller 211 as a timing signal. The controller thereby produces a set of sequence control signals 2111 to initiate a data read operation for reading data from an address of cell array 214 accessed by the content of the address latch circuit 212. The data thus read out is loaded into the shift register 231 by SDLE signal from the controller 211. That is, the data stored in the accessed address is transferred to the register 231 before receiving a data read request from CPU 11. When the counter 2352 reaches the count value "14", D-FF 2354 produces reset (ERR) signal to bring the unit 23 into an initial state.

Also in the unit 15, when the counter 1545 reaches the count value "16", FF 1547 produces a reset (SRR) signal to bring the unit 15 into an initial state.

In the second operation, i.e., in the data transfer operation on data to be written, of the unit 15, the same operation as the first operation is performed to transfer a write command and data to be written to $E^2PROM$ 2. Since the command decoder 232 in $E^2PROM$ 2 decodes the write command, it produces the active WRQ signal. The data to be written is thereby latched into the data latch circuit 216. The controller 211 generates a set of sequence control signals 2111 to initiate a data erase and write operation. The data which has been stored in the accessed data is first erased and then the data in the latch circuit 216 is written into the accessed address.

In the third operation, when CPU 11 executes a data read instruction, it generates DS signal while supplying read command data C0, C1. The command decoder 157 generates the high level DR signal. The command data C0, C1 are thereafter supplied via the SD line 3 to $E^2PROM$ 2. When the counter 1545 reaches the count value "4" to indicate that the transfer of read command is completed, the decoder 1546 produces the CD2 signal. In response thereto, SR-FF 1556 is set through AND gate 1554 and D-FF 1555. The AND gate 1551 is thereby disabled to bring the tristate output buffer 1552 into a high impedance state. The set state of FF 1556 further activates the input buffer 1553. That is, the output of the shift register 152 is disconnected from the terminal 17 and the input thereof is in turn connected to the terminal 17.

In $E^2PROM$ 2 (FIG. 3), on the other hand, the data to be transferred to the microcomputer 1 has already stored in the shift register 231, as mentioned hereinbefore. The shift register 231 shifts the read-out data rightward by two bits by receiving two-bit read command. The read command is fetched and decoded by the command decoder 232 in response to SCD1 signal from the decoder 2353. The active RRQ signal is thereby generated to set SR-FF 2335 through D-FF 2334. Accordingly, the output buffer 2332 is activated, whereas the input buffer 2331 is deactivated. That is, the shift register 231 drives the SD line 3 in response to data read out of the $E^2PROM$ cell array 214. Thus, the data is transferred serially from $E^2PROM$ 2 to the microcomputer 1. CPU 11 executes a buffer read instruction to read data from the register 152 via the buffer 151 with a data read-enable (DRE) signal.

As described above, all of the address transfer, write data transfer and read data transfer operations are performed in accordance with the timing chart shown in FIG. 6 and in synchronism with the machine cycles of CPU 11. Accordingly, CPU 11 is free from controlling the serial data communication unit 15 in an interrupt routine.

It is apparent that the present invention is not limited to the above embodiment but may be modified and changed without departing from the scope and spirit of the invention.

What is claimed is:

1. A microcomputer comprising:
   a central processing unit (CPU) for executing a string of instructions for a program, said CPU executing each of said instructions in a plurality of machine cycles, each of said machine cycles including a plurality of clocks of a clock signal; and
   a serial data communication unit comprising:
     a serial data communication terminal;
     a serial clock terminal for coupling to a peripheral device;
     first means, responsive to a transfer command from said CPU, for supplying said serial clock terminal with a serial clock signal, said serial clock signal having a same frequency as said clock signal,
     a shift register; and
     second means, responsive to said transfer command, for controlling said shift register to perform a data communication to, in a first mode, output data stored in said shift register to said serial data terminal one bit by one bit in synchronism with said serial clock signal and to, in a second mode, capture data appearing at said serial data terminal one bit by one bit in synchronism with said serial clock signal, wherein a number of bits of data outputted or captured by said shift register is smaller than a number of said machine cycles per one instruction multiplied by a number of clocks per one machine cycle.

2. The microcomputer as claimed in claim 1, wherein said plurality of machine cycles is four and said shift register completes outputting or capturing data within a period of time that is shorter than a period of time corresponding to three machine cycles.

3. The microcomputer as claimed in claim 2, wherein the number of clocks is four.

* * * * *